United States Patent
Katou et al.

(10) Patent No.: US 9,316,171 B2
(45) Date of Patent: Apr. 19, 2016

(54) INTERNAL COMBUSTION ENGINE

(71) Applicants: Yuuichi Katou, Susono (JP); Makoto Tomimatsu, Shizuoka (JP)

(72) Inventors: Yuuichi Katou, Susono (JP); Makoto Tomimatsu, Shizuoka (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/244,434

(22) Filed: Apr. 3, 2014

(65) Prior Publication Data

US 2014/0305101 A1 Oct. 16, 2014

(30) Foreign Application Priority Data

Apr. 12, 2013 (JP) .................................. 2013-084226

(51) Int. Cl.
*F01N 3/00* (2006.01)
*F02D 41/30* (2006.01)
*F02D 41/02* (2006.01)
*F02D 41/34* (2006.01)
*F02D 41/40* (2006.01)
*F02D 41/00* (2006.01)
*F02D 13/02* (2006.01)

(52) U.S. Cl.
CPC ........... *F02D 41/3094* (2013.01); *F02D 41/025* (2013.01); *F02D 41/345* (2013.01); *F02D 41/401* (2013.01); *F02D 13/0242* (2013.01); *F02D 13/0265* (2013.01); *F02D 41/006* (2013.01); *F02D 2041/001* (2013.01); *F02D 2200/0804* (2013.01); *Y02T 10/26* (2013.01); *Y02T 10/44* (2013.01)

(58) Field of Classification Search
USPC .................................................... 60/272–324
See application file for complete search history.

(56) References Cited

U.S. PATENT DOCUMENTS

| | | | |
|---|---|---|---|
| 6,394,051 B1* | 5/2002 | Filipe et al. ................ | 123/90.15 |
| 2005/0155344 A1* | 7/2005 | Kobayashi .................... | 60/286 |
| 2005/0166896 A1 | 8/2005 | Sadakane et al. | |
| 2006/0107650 A1* | 5/2006 | Tokuda ........................ | 60/284 |
| 2006/0207240 A1* | 9/2006 | Araki et al. .................. | 60/284 |
| 2006/0207241 A1* | 9/2006 | Araki et al. .................. | 60/284 |
| 2010/0161203 A1* | 6/2010 | Shigenaga et al. ............ | 701/110 |

(Continued)

FOREIGN PATENT DOCUMENTS

| | | | |
|---|---|---|---|
| JP | 2003-247443 A | 9/2003 | |
| JP | 2005-201083 A | 7/2005 | |

(Continued)

OTHER PUBLICATIONS

Translation of JP2003247443, Sugiyama Takanobu, Sep. 5, 2003.*
Translation of JP2007332867, Inoue Masahiro, Dec. 27, 2007.*

*Primary Examiner* — Jesse Bogue
(74) *Attorney, Agent, or Firm* — Dinsmore & Shohl LLP

(57) ABSTRACT

An internal combustion engine includes fuel injection valves and an ECU. In the internal combustion unit, predetermined injection is performed when the bed temperature of a catalyst is lower that a predetermined temperature. In the predetermined injection, fuel is injected from a first fuel injection valve, from among the fuel injection valves, within the valve opening period of an intake valve, and fuel is injected from a second fuel injection valve, from among the fuel injection valves, within the valve opening period of an exhaust valve. In the internal combustion engine, a first injection amount is specifically injected from the first fuel injection valve in the predetermined injection.

4 Claims, 5 Drawing Sheets

(56) References Cited

U.S. PATENT DOCUMENTS

2011/0162620 A1\* 7/2011 Bidner ............... F02D 41/0025 123/299
2014/0069080 A1\* 3/2014 Leone et al. .................... 60/274
2014/0297162 A1\* 10/2014 Surnilla ............. F02D 41/3094 701/104

FOREIGN PATENT DOCUMENTS

| JP | 2007-127059 A | 5/2007 |
| JP | 2007-332867 A | 12/2007 |
| JP | 2008-057380 A | 3/2008 |
| JP | 2010-265814 A | 11/2010 |
| JP | 2011-241714 A | 12/2011 |

\* cited by examiner

INTERNAL COMBUSTION ENGINE

INCORPORATION BY REFERENCE

The disclosure of Japanese Patent Application No. 2013-084226 filed on Apr. 12, 2013 including the specification, drawings and abstract is incorporated herein by reference in its entirety.

BACKGROUND OF THE INVENTION

1. Field of the Invention

The invention relates to an internal combustion engine.

2. Description of Related Art

There is available an internal combustion engine that includes a first injection unit that injects fuel into an intake passage communicating with a combustion chamber and a second injection unit that injects fuel into the combustion chamber (see, for example, Japanese Patent Application Publication No. 2007-127059 (JP 2007-127059 A). Other techniques that can be considered to be relating to the invention are disclosed, for example, in Japanese Patent Application Publication No. 2010-265814 (JP 2010-265814 A), Japanese Patent Application Publication No. 2008-57380 (JP 2008-57380 A), Japanese Patent Application Publication No. 2005-201083 (JP 2005-201083 A), and Japanese Patent Application Publication No. JP 2011-241714 (JP 2011-241714 A).

JP 2010-265814 A discloses the technique for promoting the atomization of the fuel injected form a port injection injector by the blowback of gas into an intake port. JP 2008-57380 A discloses the technique for injecting fuel in an exhaust stroke when the engine is started. JP 2005-201083 A discloses the technique for removing the deposit building up in the nozzle of a cylinder injection valve by performing fuel injection only with the cylinder injection valve for a predetermined period even in an operation region in which fuel injection is performed by an intake passage injection valve. JP 2011-241714 A discloses the technique for injecting a small amount of fuel from a cylinder injection valve within a minus overlap period and injecting fuel for output control from a port injection valve in the intake stroke.

In the internal combustion engine including the first and second injection units, the required injection amount is sometimes less than the sum total of the lowest injection amounts that can be injected by the injection valves. In such cases, where an attempt is made to inject fuel from both injection units, the amount of the supplied fuel becomes larger than the required injection amount and the fuel-air mixture becomes rich, thereby destabilizing the combustion. To resolve this problem, the required injection amount can be injected, for example, from the first injection unit, from among the first and second injection units. As a result, the fuel is supplied under a low pressure and the injection amount is easily controlled, thereby making it possible to obtain stable combustion.

However, in such cases, the fuel is not injected from the second injection unit. Therefore, in such cases, deposits can appear and build up in the nozzle of the second injection unit. Meanwhile, in order to clean the exhaust gas in the internal combustion engine, it is desirable that warm-up of a catalyst be promoted in the case in which the bed temperature of the catalyst is lower than a predetermined temperature (for example, activity temperature).

SUMMARY OF THE INVENTION

It is an object of the invention to provide an internal combustion engine in which the deposit build-up in the nozzle of the second injection unit can be advantageously prevented or inhibited by injecting the fuel rationally from the second injection unit in addition to the injection from the first injection unit even when it is desired to inject the required injection amount from the first injection unit.

According to an aspect of the invention, an internal combustion engine includes: a first injection unit injecting fuel into an intake passage communicating with a combustion chamber; a second injection unit injecting fuel into the combustion chamber; and an intake valve and an exhaust valve arranged with respect to the combustion chamber, wherein, when a bed temperature of a catalyst for purifying exhaust gas discharged from the combustion chamber is lower than a predetermined temperature, predetermined injection is performed in such a manner that fuel is injected from the first injection unit, from among the first and second injection units, within a valve opening period of the intake valve, and fuel is injected from the second injection unit, from among the first and second injection units, within a valve opening period of the exhaust valve.

The internal combustion engine according to the above-described aspect may be configured to further include a piston adjacent to the combustion chamber, and a valve train changing at least a valve closing timing of the exhaust valve, from among valve characteristics of the intake valve and the exhaust valve, wherein the predetermined injection is performed in a predetermined case and in a case in which the bed temperature of the catalyst is lower than a predetermined temperature, and the predetermined case is a case in which the valve train is in a state of closing the exhaust valve on an advance side with respect to the exhaust top dead center of the piston and forming a minus overlap between the intake valve and the exhaust valve.

According to the above-described aspect of the invention, the deposit build-up in the nozzle of the second injection unit can be advantageously prevented or inhibited by injecting the fuel rationally from the second injection unit in addition to the injection from the first injection unit even when it is desired to inject the required injection amount from the first injection unit.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the invention is described below with reference to the appended drawings.

Figure 1:
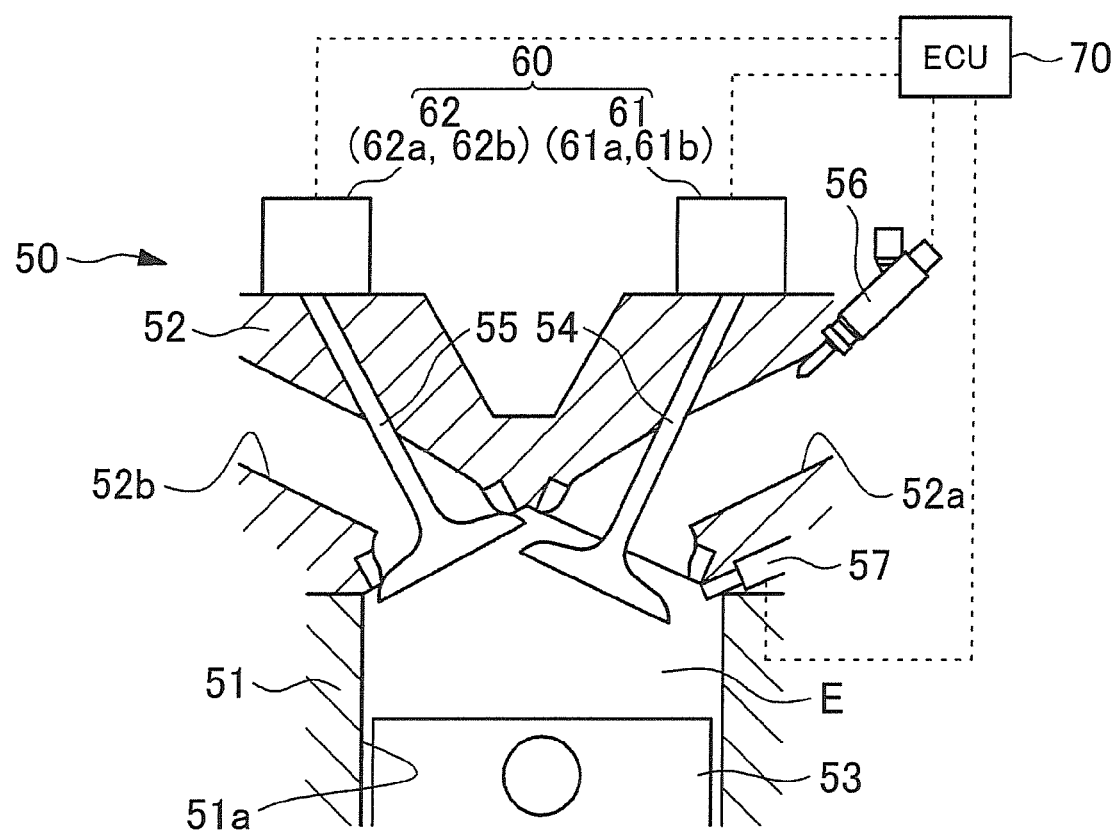
FIG. 1 is a schematic configuration diagram of an internal combustion engine.
Figure 2:
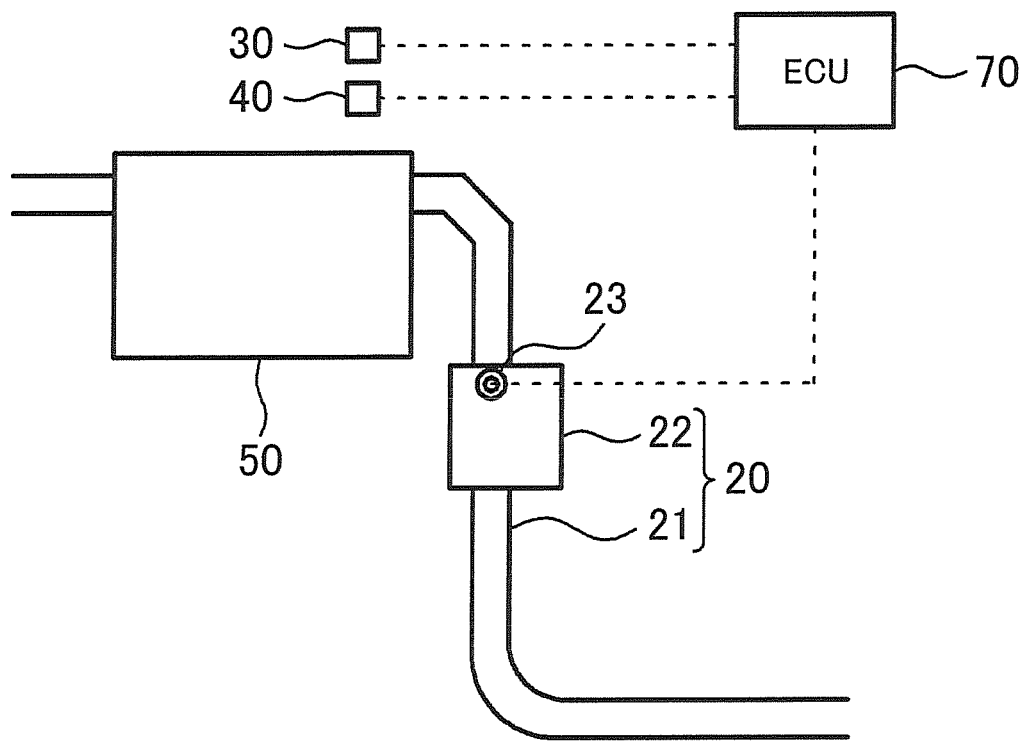
FIG. 2 shows an exhaust system of the internal combustion engine.

FIG. 1 is a schematic configuration diagram of an internal combustion engine 50. FIG. 2 illustrates an exhaust system 20 of the internal combustion engine 50. The internal combustion engine 50 is provided with a cylinder block 51, a cylinder head 52, a piston 53, an intake valve 54, an exhaust valve 55, a first fuel injection valve 56, a second fuel injection valve 57, a valve train 60, and an ECU 70.

A cylinder 51a is formed in the cylinder block 51. The piston 53 is accommodated inside the cylinder 51a. The cylinder head 52 is fixed to the upper surface of the cylinder block 51. A combustion chamber E is formed as a space bounded by the cylinder block 51, the cylinder head 52, and the piston 53. The piston 53 is adjacent to the combustion chamber E.

An intake port 52a introducing intake air into the combustion chamber E, and an exhaust port 52b discharging gas from the combustion chamber E are formed in the cylinder head 52. The intake valve 54 that opens and closes the intake port 52a, and the exhaust valve 55 that opens and closes the exhaust port 52b are also provided in the cylinder head 52. The intake port 52a forms an intake passage. The intake passage communicates with the combustion chamber E.

The first and second fuel injection valves 56, 57 are both provided in the cylinder head 52. The first fuel injection valve 56 injects fuel into the intake passage formed by the intake port 52a. The second fuel injection valve 57 injects fuel into the combustion chamber E. The second fuel injection valve 57 is provided in a portion on the intake side, from among the intake side and exhaust side of the cylinder head 52. The arrangement of the second fuel injection valve 57 is not necessarily limited thereto. The first fuel injection valve 56 corresponds to the first injection unit, and the second fuel injection valve 57 corresponds to the second injection unit.

The cylinder head 52 is provided with the valve train 60. The valve train 60 is provided with an intake-side variable valve train 61 capable of changing the valve characteristics of the intake valve 54, and an exhaust-side variable valve train 62 capable of changing the valve characteristics of the exhaust valve 55. The valve characteristics include the valve opening timing, valve closing timing, lift amount, or a combination thereof (for example, the opening-closing timing, or the valve closing timing and the lift amount, or the valve opening timing, valve closing timing, and lift amount).

The intake-side variable valve train 61 is configured by an intake-side valve timing variable mechanism 61a changing the opening-closing timing of the intake valve 54, and an intake-side lift amount variable mechanism 61b changing the operation angle (valve opening period) of the intake valve 54. The exhaust-side variable valve train 62 is configured by an exhaust-side valve timing variable mechanism 62a changing the opening-closing timing of the exhaust valve 55, and an exhaust-side lift amount variable mechanism 62b changing the operation angle of the exhaust valve 55.

The valve timing variable mechanisms 61a, 62a are each specifically of a hydraulic drive system and configured to have an oil control unit that controls the transmission of oil pressure. The lift amount variable mechanisms 61b, 62b are each specifically of an electric system and have an electric actuator. The electric actuator is, for example, a control motor. The lift amount variable mechanisms 61b, 62b may be also of a hydraulic drive system, similarly to the respective valve timing variable mechanisms 61a, 62a.

The intake-side lift amount variable mechanism 61b is configured to change the valve opening timing of the intake valve 54 by changing the operation angle of the intake valve 54. The intake-side lift amount variable mechanism 61b is specifically configured such that the valve opening timing of the intake valve 54 advances when the operation angle is enlarged, and the valve opening timing of the intake valve 54 lags when the operation angle is reduced. Even more specifically, the intake-side lift amount variable mechanism 61b is configured such that the valve closing timing of the intake valve 54 lags when the operation angle is enlarged, and the valve closing timing of the intake valve 54 advances when the operation angle is reduced.

The exhaust-side lift amount variable mechanism 62b is configured to change the valve closing timing of the exhaust valve 55 by changing the operation angle of the exhaust valve 55. The exhaust-side lift amount variable mechanism 62b is specifically configured such that the valve closing timing of the exhaust valve 55 lags when the operation angle is enlarged, and the valve closing timing of the exhaust valve 55 advances when the operation angle is reduced. Even more specifically, the exhaust-side lift amount variable mechanism 62b is configured such that the valve opening timing of the exhaust valve 55 advances when the operation angle is enlarged, and the valve opening timing of the exhaust valve 55 lags when the operation angle is reduced.

The exhaust-side variable valve train 62 can change the valve closing timing of the exhaust valve 55 by changing the opening-closing timing of the exhaust valve 55 with the exhaust-side valve timing variable mechanism 62a. The exhaust-side variable valve train 62 can also change the valve closing timing of the exhaust valve 55 by changing the operation angle of the exhaust valve 55 with the exhaust-side lift amount variable mechanism 62b.

As a result of being provided with the exhaust-side variable valve train 62, the valve train 60 can change at least the valve closing timing of the exhaust valve 55, from among the valve characteristics of the intake valve 54 and the exhaust valve 55. Such a valve train can be configured to include at least the exhaust-side variable valve train 62 from among the intake-side variable valve train 61 and the exhaust-side variable valve train 62. The exhaust-side variable valve train 62 in such a valve train can be configured to include at least either of the exhaust-side valve timing variable mechanism 62a and the exhaust-side lift amount variable mechanism 62b. The valve train is not limited to those described hereinabove and may be another valve train that can change the valve closing timing of the exhaust valve 55.

The exhaust system 20 is connected to the internal combustion engine 50. The exhaust system 20 is provided with an exhaust pipe 21 and a catalyst 22. The exhaust pipe 21 forms an exhaust passage. The exhaust passage communicates with the combustion chamber E. The catalyst 22 is provided so as to be introduced in the exhaust pipe 21 and cleans the exhaust gas discharged from the combustion chamber E. The catalyst 22 is specifically, for example, a three-way catalyst. The catalyst 22 is provided with an exhaust gas temperature sensor 23.

The ECU 70 is an electronic control device. The valve train 60 (more specifically, oil control units and electric actuators of the variable valve trains 61, 62) is electrically connected as a control object to the ECU 70. The exhaust gas temperature sensor 23, a first sensor group 30 for detecting the operation state of the internal combustion engine 50, or a second sensor group 40 for detecting the state of the valve train 60 is also electrically connected as a sensor switch.

The first sensor group 30 includes, for example, a crank angle sensor that can detect the revolution speed of the internal combustion engine 50, an air flow meter that measures an intake air amount of the internal combustion engine 50, an accelerator depression amount sensor issuing an acceleration request to the internal combustion engine 50, and a water temperature sensor detecting the cooling water temperature of the internal combustion engine 50. The second sensor group 40 includes, for example, sensors for detecting the valve opening timing and valve closing timing of the intake valve 54 and the exhaust valve 55, and a sensor for detecting the set lift amount (or the set operation angle) of the intake valve 54 and the exhaust valve 55. The set lift amount is, for example, a lift amount determined by the maximum lift amount.

For example, the below-described control unit, injection control unit, estimation unit, and determination unit are realized by a central processing unit (CPU) of the ECU 70 executing the processing while using, as necessary, the temporary storage area of a random access memory (RAM) on the basis of a program stored in a read only memory (ROM). Those configurations may be also individually realized for each feature, for example, by using a plurality of electronic control units.

The control unit controls the valve train 60. The control unit controls the valve train 60, for example, such that the exhaust valve 55 is closed on the advance side with respect to the exhaust top dead center of the piston 53 and such that a minus overlap is formed between the intake valve 54 and the exhaust valve 55. The minus overlap is the overlap of the valve closing period between the intake valve 54 and the exhaust valve 55, more specifically the overlap of the valve closing period formed from the valve closing timing of the exhaust valve 55 till the valve opening timing of the intake valve 54. The control unit controls the valve train 60 in the above-described manner, for example, when the operation state of the internal combustion engine 50 is a high-temperature low-load state including a high-temperature idle period. The valve train 60 may be also understood as a configuration including the control unit.

The injection control unit controls fuel injection of the fuel injection valves 56, 57. The injection control unit controls the fuel injection valves 56, 57 such that a predetermined injection I is performed when the bed temperature of the catalyst 22 is lower that a preset temperature T (in this case, equal to or lower than the predetermined temperature T). The predetermined temperature T is, for example, activity temperature of the catalyst 22. In the predetermined injection I, the fuel is injected from the first fuel injection valve 56, from among the fuel injection valves 56, 57, within the valve opening period of the intake valve 54, and the fuel is injected from the second fuel injection valve 57, from among the fuel injection valves 56, 57, within the valve opening period of the exhaust valve 55. In the internal combustion engine 50, the predetermined injection I is performed when the bed temperature of the catalyst 22 is lower than the predetermined temperature T on the basis of such control executed by the injection control unit.

The injection control unit controls the fuel injection valves 56, 57 such that the predetermined injection I is performed in a predetermined case (A) in which the bed temperature of the catalyst 22 is lower than the predetermined temperature T. The predetermined case (A) is a case in which the valve train 60 is in a state of closing the exhaust valve 55 on the advance side with respect to the exhaust top dead center of the piston 53 and forming a minus overlap.

In the predetermined injection I, the injection control unit specifically controls the fuel injection valves 56, 57 such that a first injection amount TAU is injected from the first fuel injection valve 56, and a second injection amount Q is injected from the second fuel injection valve 57. The first fuel injection amount TAU is the required injection amount, more specifically the injection amount required per cylinder of the internal combustion engine 50. The first injection mount TAU is the injection amount corresponding to the required output. The second injection amount Q is an additional injection amount which is different from the first injection amount TAU and injected in addition to the first injection amount TAU.

Concerning the first injection amount TAU, the injection control unit sets the injection sharing ratio of the first injection amount TAU among the fuel injection valves 56, 57. Therefore, the first injection amount TAU can be more specifically defined as an injection amount for which the injection sharing ratio is set among the fuel injection valves 56, 57.

The injection control unit determines the injection sharing ratio, for example, such that the first injection amount TAU is injected from the first fuel injection valve 56, from among the fuel injection valves 56, 67, in the predetermined case (A). Thus, the setting of the injection sharing ratio, as viewed from the first fuel injection valve 56 (referred to hereinbelow simply as the injection sharing ratio of the first fuel injection valve 56), is taken as 100%. More specifically, in the predetermined injection I, the first fuel injection valve 56 injects the first injection amount TAU by determining such an injection sharing ratio.

Figure 3:
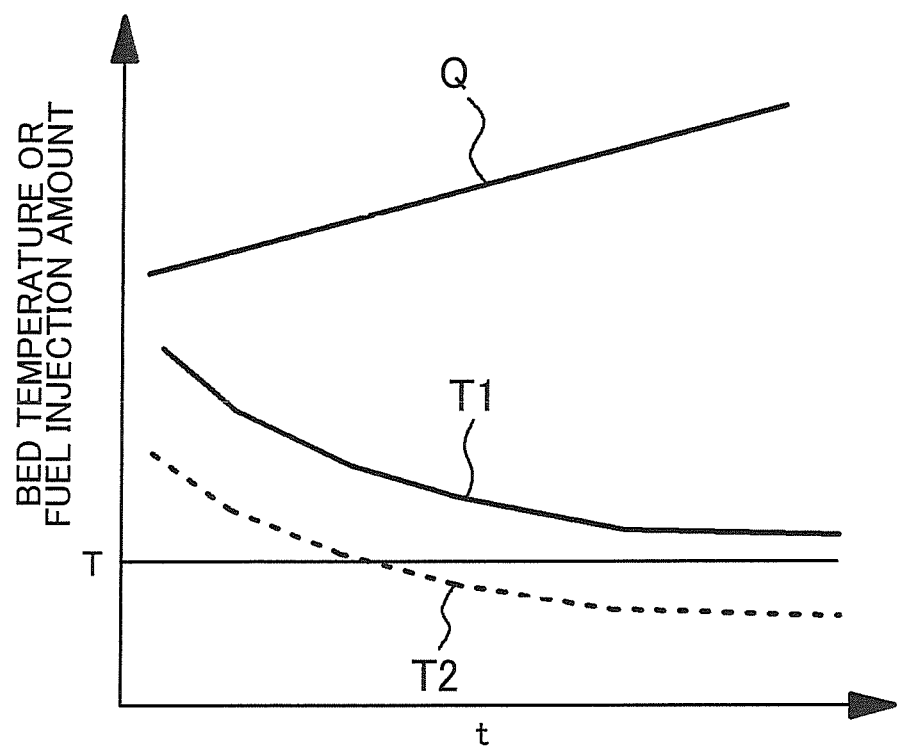
FIG. 3 is an explanatory drawing of a second injection amount.

FIG. 3 is an explanatory drawing showing the second injection amount Q. On the ordinate in FIG. 3, the fuel injection amount is shown with respect to the second injection amount Q, and the bed temperature of the catalyst 22 is shown with respect to temperatures T1, T2. A period t required to restart the internal combustion engine 50 after the engine has been stopped is plotted on the abscissa. The temperature T1 is the bed temperature of the catalyst 22 in the case in which fuel injection is performed from the second fuel injection valve 57 during idling immediately after the engine has been restarted. The temperature T2 is the bed temperature of the catalyst 22 in the case in which no fuel injection is performed from the second fuel injection valve 57 during idling immediately after the engine has been restarted.

As shown in FIG. 3, the temperatures T1, T2 decrease as the period t is extended. It is also clear that where the period t is extended, the temperature T2 decreases below a predetermined T, whereas the temperature T1 is higher than the predetermined temperature T, regardless of the period t. This is because the bed temperature of the catalyst 22 is raised by the post-combustion of the fuel injected from the second fuel injection valve 57 during idling immediately after the internal combustion engine 50 has been restarted. Another reason is that the injection control unit changes the second injection mount Q so that the bed temperature of the catalyst 22 becomes higher than the preset temperature T.

More specifically, when the second injection amount Q is thus changed, the injection control unit changes the second injection amount Q according to the bed temperature of the catalyst 22. Even more specifically, the injection control unit changes the second injection amount Q so that the second injection amount Q increases with the decrease in the bed temperature of the catalyst 22. The second injection amount Q can be set in advance with map data according to the bed temperature of the catalyst 22. The injection control unit may be also configured as a plurality of injection control units (for example, first and second injection control units) that differ, for example, in control contents.

Specifically in the predetermined injection I, the injection control unit controls the first fuel injection valve 56 such that the fuel injection is started from the first fuel injection valve 56 at the valve opening timing (IVO) of the intake valve 54. In other words, in the predetermined injection I, the injection control unit synchronizes the fuel injection start timing of the first fuel injection valve 56 with the IVO. In the predetermined injection I, the injection control unit can inject the fuel from the second fuel injection valve 57 at least in either one stroke from among the expansion stroke and exhaust stroke.

The estimation unit estimates the bed temperature of the catalyst 22. The estimation unit can estimate the bed temperature of the catalyst 22, for example, by estimating the amount of heat received and released by the catalyst 22 on the basis of the intake air amount, exhaust temperature, and period t of the internal combustion engine 50. The bed temperature of the catalyst 22 may be estimated, for example, on the basis of the cooling water temperature of the internal combustion engine 50. Alternatively, the bed temperature of the catalyst 22 may be directly detected, for example, with a sensor.

The determination unit performs various types of determination. The determinations performed by the determination unit are explained in the explanation of the operation of the ECU 70 presented hereinbelow. The determination unit can be understood, for example, as a determination unit performing at least some of a plurality of different determinations. In this case the determination unit may be configured as a plurality of determination units (for example, first and second determination units) that differ, for example, in determination contents.

Figure 4:
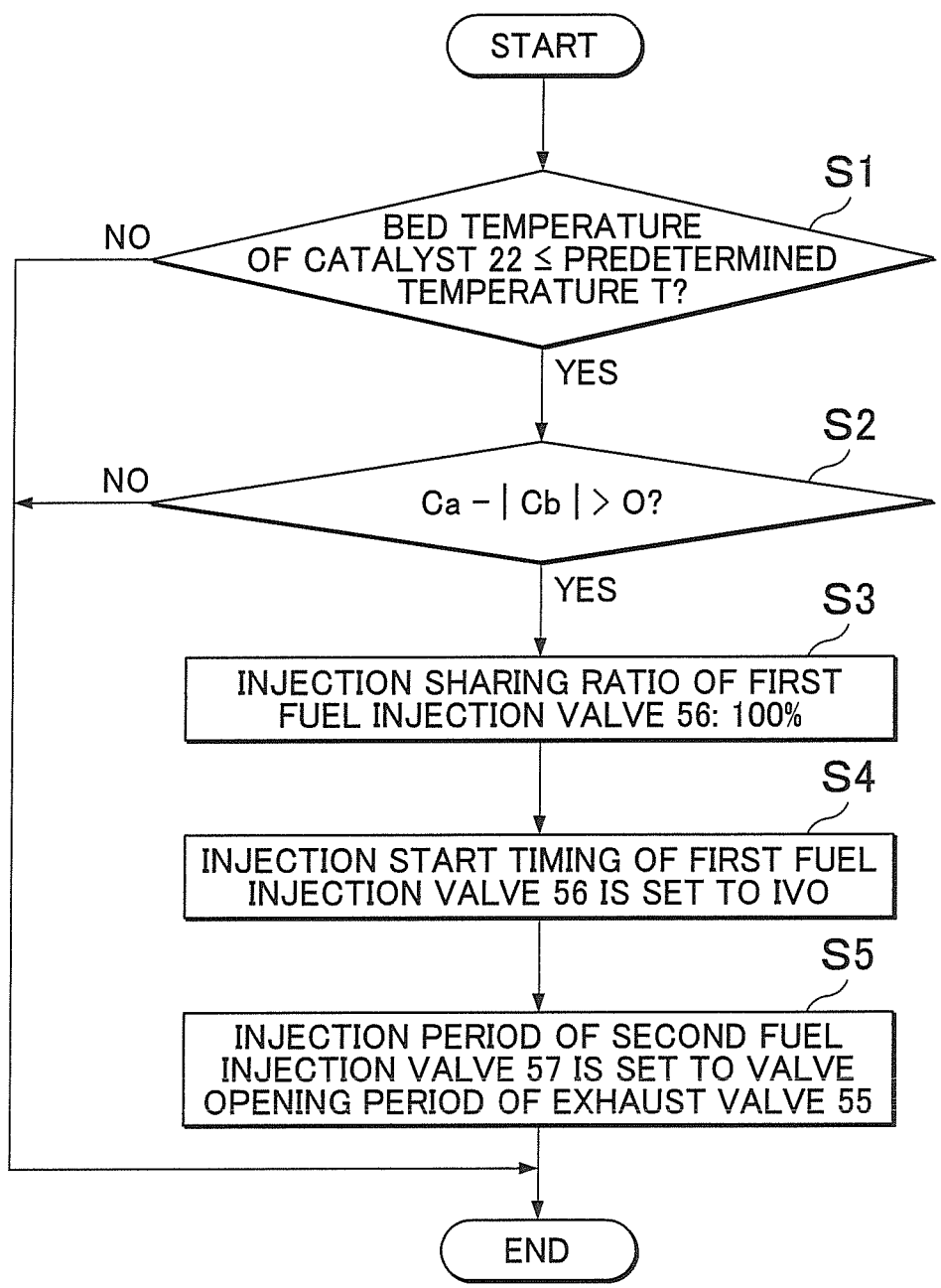
FIG. 4 shows by a flowchart an example of control operation.

An example of the control operations performed by the ECU 70 is explained below by using a flowchart shown in FIG. 4. In the ECU 70, the bed temperature of the catalyst 22 is estimated and the second injection amount Q is changed separately from each other and at all times. The ECU 70 determines whether or not the bed temperature of the catalyst 22 is equal to or lower than the predetermined temperature T (step S1). Where a positive determination is made, the ECU 70 determines whether or not periods Ca, Cb fulfill the condition Ca−|Cb|>0 (whether or not a value obtained by subtracting the period Cb from the period Ca is greater than zero) (step S2).

The period Ca is a period between the valve closing timing of the exhaust valve 55 and the exhaust top dead center thereof. The period Cb is a period between the exhaust top dead center and the valve opening timing of the intake valve 54. The period Ca is taken to be positive when the valve closing timing of the exhaust valve 55 and the exhaust top dead center arrive in the order of description, and the period Cb is taken to be positive when the exhaust top dead center and the valve opening timing of the intake valve 54 arrive in the order of description. When Ca−|Cb| is greater than zero, it indicates a minus overlap amount. The valve opening timing of the intake valve 54 may be set, for example, to the advance side with respect to the exhaust top dead center.

In step S2, it is determined whether or not a state is assumed in which the exhaust valve 55 is closed on the advance side with respect to the exhaust top dead center and a minus overlap is formed. Therefore, where a positive determination is made in both step S1 and step S2, it is determined that the predetermined case (A) is realized in which the bed temperature of the catalyst 22 is lower than the predetermined temperature T. Where a negative determination is made in step S1 or step S2, the present flowchart is ended.

Where a positive determination is made in step S2, the ECU 70 sets the injection sharing ratio of the first fuel injection valve 56 to 100% (step S3). As a result, the injection amount of the first fuel injection valve 56 is set to the first injection amount TAU. After step S3, the ECU 70 synchronizes the injection start timing of the first fuel injection valve 56 with the IVO (step S4). Further, the fuel injection from the second fuel injection valve 57 is set to the valve opening period of the exhaust valve 55 (step S5). In step S4, the fuel injection from the first fuel injection valve 56 is simultaneously set to the valve opening period of the intake valve 54 by synchronizing the injection start timing of the first fuel injection valve 56 with the IVO. After step S5, the present flowchart is ended.

Figure 5:
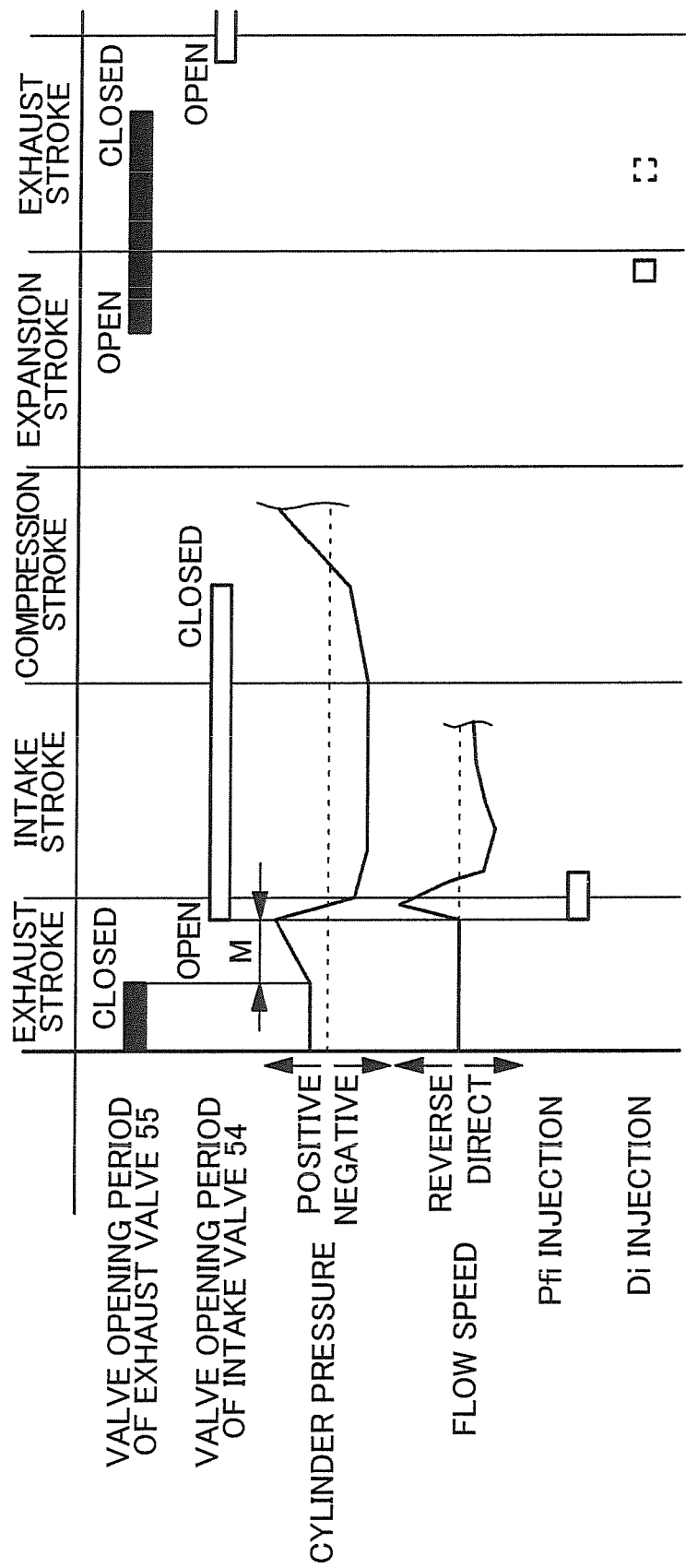
FIG. 5 shows an example of fuel injection performed by the internal combustion engine.

FIG. 5 shows an example of fuel injection performed by the internal combustion engine 50. The cylinder pressure indicates the pressure in the combustion chamber E. The flow speed indicates the flow speed of gas in the intake port 52a. The direct flow indicates the flow from the intake port 52a to the combustion chamber E, and the reverse flow indicates the flow from the combustion chamber E to the intake port 52a. The Pfi injection indicates fuel injection from the first fuel injection valve 56. The Di injection indicates fuel injection from the second fuel injection valve 57. The period M indicates the minus overlap period.

In the internal combustion engine 50, the exhaust valve 55 is closed in the exhaust stroke. As a result, the gas in the combustion chamber E is recompressed in the period M, whereby the cylinder pressure is raised. Where the intake valve 54 is thereafter opened, the cylinder pressure drops and changes from a positive pressure to a negative pressure. In this case, the high-temperature high-pressure gas is blown back from the combustion chamber E into the intake port 52a. Therefore, the flow speed is reversed.

In the internal combustion engine 50, the Pfi injection is performed in the valve opening period of the intake valve 54. More specifically, in the internal combustion engine 50, the Pfi injection is performed in conformity with the aforementioned back-blowing of the gas. Even more specifically, when the fuel is thus injected in the internal combustion engine 50, the injection start timing of the Pfi injection is synchronized with the IVO. As a result, in the internal combustion engine 50, the fuel is injected from the first fuel injection valve 56 against the back-blown gas.

In the internal combustion engine 50, the Di injection is performed in the valve opening period of the exhaust valve 55. More specifically, the Di injection in the internal combustion engine 50 is performed in the second half of the expansion stroke. The Di injection in the internal combustion engine 50 may be also performed in the exhaust stroke, for example, as shown by a dot line. The fuel injected by the Di injection makes no contribution to the combustion and is used for afterburning. In the Di injection, at least a minimum injection amount of fuel that can be injected from the second fuel injection valve 57 can be injected.

The main operation effects of the internal combustion engine 50 are explained below. In the internal combustion engine 50, the predetermined injection I is performed when the bed temperature of the catalyst 22 is lower than the predetermined temperature T. Therefore, in the internal combustion engine 50, the build-up of deposits in the nozzle of the second fuel injection valve 57 can be prevented or inhibited. At the same time, in the internal combustion engine 50, the fuel injected from the second fuel injection valve 57 can be also used for raising the bed temperature of the catalyst 22 by afterburning.

Therefore, in the internal combustion engine 50, the deposit build-up in the nozzle of the second fuel injection valve 57 can be advantageously prevented or inhibited by injecting the fuel rationally from the second fuel injection valve 57 in addition to the first fuel injection valve 56 even when it is desired to inject the first injection amount TAU from the first fuel injection valve 56. Thus, since it is possible to increase at the same time the bed temperature of the catalyst 22 in the internal combustion engine 50, the deposit build-up in the nozzle of the second fuel injection valve 57 can be advantageously prevented or inhibited.

More specifically, the internal combustion engine 50 can be configured to perform the predetermined injection I in the predetermined case (A) in which the bed temperature of the catalyst 22 is lower than the predetermined temperature T. Thus, in the predetermined case (A), where the intake valve 54 is opened, the high-temperature high-pressure gas is blown back from the combustion chamber E into the intake port 52*a*, as explained hereinabove with reference to FIG. 5.

In the predetermined case (A) in which such back-blowing of gas occurs, for example, the injected fuel can be atomized by injecting the fuel from the first fuel injection valve 56. Therefore, the predetermined case (A) is suitable for injecting the first injection amount TAU from the first fuel injection valve 56, from among the fuel injection valves 56, 57. As a result, the internal combustion engine 50 can specifically and advantageously demonstrate the above-described operation effect, for example, with such a configuration.

The internal combustion engine 50 can be specifically configured such that the first injection amount TAU is injected from the first fuel injection valve 56 in the predetermined injection I. Thus, the internal combustion engine 50 can be specifically configured such that the first injection amount TAU is actually injected from the first fuel injection valve 56.

The internal combustion engine 50 can be also specifically configured such that the fuel injection start timing of the first fuel injection valve 56 is synchronized with the IVO in the predetermined injection I. Therefore, it is possible to inject the fuel from the first fuel injection valve 56 against the gas blown back from the combustion chamber E into the intake port 52*a*. As a result, the fuel can be advantageously atomized.

Further, in the internal combustion engine 50 of such configurations, the amount of the back-blown gas can be reduced and the nozzle of the first fuel injection valve 56 can be prevented from being easily exposed to the back-blown gas, by dropping the pressure of the back-blown gas using the fuel injection pressure. As a result, the deposit buildup in the nozzle of the first fuel injection valve 56" can be advantageously prevented or inhibited. Further, in the internal combustion engine 50 of such configuration, controllability of the air-fuel ratio can be also increased because the prevention or inhibition of injected fuel deposition on the wall surface of the intake port 52*a* is coupled with fuel atomization. As a result, combustion stability in the case of fuel injection from the first fuel injection valve 56 can be ensured.

The internal combustion engine 50 can be specifically configured such that the second injection amount Q is injected from the second fuel injection valve 57 in the predetermined injection I and the second injection amount Q is changed according to the bed temperature of the catalyst 22. As a result, the exhaust emission can be advantageously reduced by raising the bed temperature of the catalyst 22 while optimizing the injection amount.

The predetermined case (A) may be, for example, the case in which the first injection amount TAU is less than the sum total of minimum injection amounts that can be injected by the fuel injection valves 56 and 57. This case is also suitable for injecting the first injection amount TAU from the first fuel injection valve 56, from among the fuel injection valves 56 and 57. Therefore, the internal combustion engine 50 can also advantageously demonstrate the operation effect also in this case.

The examples of the invention are described in detail hereinabove, but the invention is not limited to those specific examples, and various changes and modifications can be made without departing from the scope of the invention set forth in the claims.

What is claimed is:

1. An internal combustion engine comprising:
   a first injection unit injecting fuel into an intake passage communicating with a combustion chamber;
   a second injection unit injecting fuel into the combustion chamber;
   an intake valve and an exhaust valve arranged with respect to the combustion chamber; and
   a control unit performing a predetermined injection such that when a bed temperature of a catalyst for purifying exhaust gas discharged from the combustion chamber is lower than a predetermined temperature, fuel is injected from the first injection unit, from among the first and second injection units, during a valve opening period of the intake valve, and fuel is injected from the second injection unit, from among the first and second injection units, during a valve opening period of the exhaust valve.

2. The internal combustion engine according to claim 1, comprising
   a piston adjacent to the combustion chamber, and a valve train changing at least a valve closing timing of the exhaust valve, from among valve characteristics of the intake valve and the exhaust valve, wherein
   the control unit performs the predetermined injection in a predetermined case and in a case in which the bed temperature of the catalyst is lower than a predetermined temperature, and
   the predetermined case is a case in which the valve train is in a state of closing the exhaust valve on an advance side with respect to an exhaust top dead center of the piston and forming a minus overlap between the intake valve and the exhaust valve.

3. The internal combustion engine according to claim 1, wherein
   the control unit sets a fuel amount to be injected by the first injection unit as an injection amount required per cylinder.

4. The internal combustion engine according to claim 1, wherein
   the control unit changes a fuel amount to be injected from the second injection unit, according to the bed temperature of the catalyst.

* * * * *

UNITED STATES PATENT AND TRADEMARK OFFICE
CERTIFICATE OF CORRECTION

PATENT NO. : 9,316,171 B2  
APPLICATION NO. : 14/244434  
DATED : April 19, 2016  
INVENTOR(S) : Yuuichi Katou et al.

Page 1 of 1

It is certified that error appears in the above-identified patent and that said Letters Patent is hereby corrected as shown below:

In the Claims

In Column 10, Claim 1, Line 21, delete "control unit performing" and insert --control unit configured to perform--, therefor.

In Column 10, Claim 2, Line 36, delete "control unit performs" and insert --control unit is configured to perform--, therefor.

In Column 10, Claim 3, Line 47, delete "control unit sets" and insert --control unit is configured to set--, therefor.

In Column 10, Claim 4, Line 52, delete "control unit changes" and insert --control unit is configured to change--, therefor.

Signed and Sealed this  
Twenty-first Day of June, 2016

Michelle K. Lee  
*Director of the United States Patent and Trademark Office*